United States Patent [19]

Ishihara et al.

[11] Patent Number: 5,390,264
[45] Date of Patent: Feb. 14, 1995

[54] IMAGE PROCESSING METHOD FOR CORRECTING A TARGET PIXEL USING EMPHASIZING AND SMOOTHING COMPONENTS

[75] Inventors: Hideshi Ishihara, Katano; Haruo Yamashita, Osaka; Tsumoru Fukushima, Katano, all of Japan

[73] Assignee: Matsushita Electric Industrial Co., Ltd., Osaka, Japan

[21] Appl. No.: 987,220

[22] Filed: Dec. 8, 1992

[30] Foreign Application Priority Data

Dec. 9, 1991 [JP] Japan .................................. 3-324655

[51] Int. Cl.$^6$ ............................................. G06K 9/40
[52] U.S. Cl. ........................................ 382/54; 382/41; 358/456
[58] Field of Search .................... 382/54, 41; 358/455, 358/456, 458; G06K 9/36, 9/40; H04N 1/40, 1/417

[56] References Cited

U.S. PATENT DOCUMENTS 4,941,190  7/1990  Joyce .................................. 382/54
4,953,114  8/1990  Sato .................................. 358/456

FOREIGN PATENT DOCUMENTS 61-146347  1/1988  Japan .

Primary Examiner—Yon J. Couso
Attorney, Agent, or Firm—Wenderoth, Lind & Ponack

[57] ABSTRACT

In an image processing method for correcting a target pixel using emphasizing and smoothing components, a microcomputer stores the input image signal into an image memory, and generates the enhancement coefficient k data in the enhancement coefficient table memory using a function with an input/output characteristic whereby the output is a simple increasing value when the input is approximately zero. Using a first difference, which is the difference of the target pixel signal minus the signal of the reference pixel positioned on a first direction, the enhancement coefficient k is obtained by referencing the enhancement coefficient table, and the target pixel is enhanced proportionally to the enhancement coefficient k and the first difference. The target pixel is also gradated or smoothed in proportion to the enhancement coefficient k and the second difference, which is the target pixel signal minus the average of the signals of the second and third reference pixels, which are the reference pixels in the directions perpendicular to the first direction and on opposite sides of the target pixel. The target pixel signal is corrected by repeating this process for each of the reference pixels positioned on the four directions surrounding the target pixel, and the corrected image signal is stored to the image memory. The enhanced image signal is obtained by repeating this process for all input image signals.

7 Claims, 11 Drawing Sheets

*Fig.6a*      *Fig.6b*
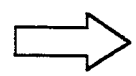
*Fig.6c*      *Fig.6d*
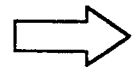
*Fig.6e*      *Fig.6f*
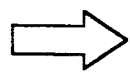

Fig.7a

| 100 | 100 | 100 | 100 | 100 |
|---|---|---|---|---|
| 100 | 100 | 100 | 100 | 100 |
| 100 | 100 | 161 | 100 | 100 |
| 100 | 100 | 100 | 100 | 100 |
| 100 | 100 | 100 | 100 | 100 |

Fig.7b

|  |  |  |  |  |
|---|---|---|---|---|
|  | 100 | 69 | 100 |  |
|  | 69 | 255 | 69 |  |
|  | 100 | 69 | 100 |  |
|  |  |  |  |  |

Fig.7c

| 100 | 100 | 130 | 100 | 100 |
|---|---|---|---|---|
| 100 | 100 | 130 | 100 | 100 |
| 100 | 100 | 130 | 100 | 100 |
| 100 | 100 | 130 | 100 | 100 |
| 100 | 100 | 130 | 100 | 100 |

Fig.7d

|  |  |  |  |  |
|---|---|---|---|---|
|  | 100 | 130 | 100 |  |
|  | 100 | 130 | 100 |  |
|  | 100 | 130 | 100 |  |
|  |  |  |  |  |

Fig.7e

| 100 | 100 | 130 | 100 | 100 |
|---|---|---|---|---|
| 100 | 100 | 100 | 130 | 100 |
| 100 | 100 | 130 | 100 | 100 |
| 100 | 100 | 100 | 130 | 100 |
| 100 | 100 | 130 | 100 | 100 |

Fig.7f

|  |  |  |  |  |
|---|---|---|---|---|
|  | 100 | 55 | 190 |  |
|  | 100 | 190 | 55 |  |
|  | 100 | 55 | 190 |  |
|  |  |  |  |  |

Fig.10a

| 100 | 100 | 100 | 100 | 130 |
|-----|-----|-----|-----|-----|
| 100 | 100 | 100 | 130 | 130 |
| 100 | 100 | 130 | 130 | 130 |
| 100 | 130 | 130 | 130 | 130 |
| 130 | 130 | 130 | 130 | 130 |

Fig.10b

|  |  |  |  |  |
|---|---|---|---|---|
|  | 97 | 95 | 134 |  |
|  | 95 | 134 | 132 |  |
|  | 134 | 132 | 130 |  |
|  |  |  |  |  |

Fig.11a

| 100 | 100 | 100 | 100 | 130 |
|-----|-----|-----|-----|-----|
| 100 | 100 | 100 | 130 | 130 |
| 100 | 100 | 130 | 130 | 130 |
| 100 | 130 | 130 | 130 | 130 |
| 130 | 130 | 130 | 130 | 130 |

Fig.11b

|  |  |  |  |  |
|---|---|---|---|---|
|  | 100 | 100 | 130 |  |
|  | 100 | 130 | 130 |  |
|  | 130 | 130 | 130 |  |
|  |  |  |  |  |

Fig.12

$A(i,j-1) = (k+k2) \cdot \{D(i,j) - D(i,j-1)\}$ — S1403

$B(i,j-1) = (k-k2) \cdot [D(i,j) - \{D(i-1,j) + D(i+1,j)\}/2]$ — S1404

*Fig.14a*
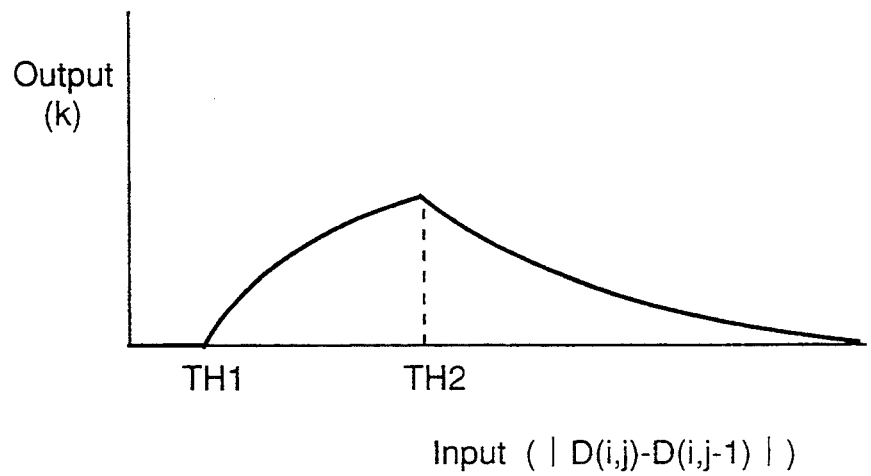
*Fig.14b*
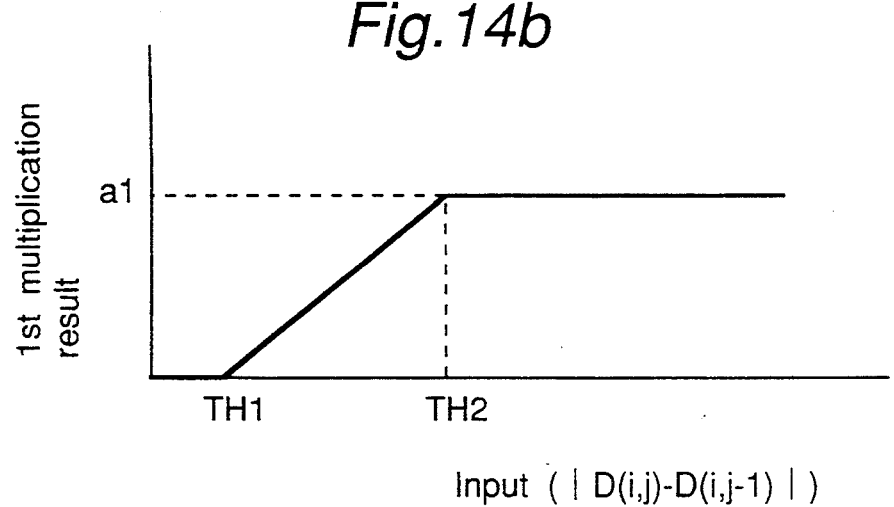
*Fig.15*
| | D(1,j-1) | |
|---|---|---|
| D(i-1,j) | D(i,j) | D(i+1,j) |
| | D(i,j+1) | |

IMAGE PROCESSING METHOD FOR CORRECTING A TARGET PIXEL USING EMPHASIZING AND SMOOTHING COMPONENTS

BACKGROUND OF THE INVENTION

1. Field of the Invention

The present invention relates to an image processing method for correcting an input image signal using a spatial filter to sharpen blurred images.

2. Description of the Prior Art

It is known that the MTF (modulation transfer function) drops and image blurring occurs in digital photocopiers, facsimile machines, and other document readers because of the spatial frequency characteristics of the lens and other optical system components and the CCD and other photoelectric conversion sensors.

Image blurring occurs because the spatial frequency characteristics of the optical system and sensors attenuate high frequency components greater than low frequency components. Conventionally, this image blurring has been corrected by enhancing the high frequency component of the image to effectively sharpen the image. This is achieved by applying a spatial filtering process called a Laplacian filter using the Laplacian component, which is the quadratic differential of the image, correcting MTF deterioration, and thus sharpening the playback image.

This Laplacian filtering process is described below, and the Laplacian principle is illustrated in FIG. 15.

In FIG. 15, the target pixel signal is D(i,j), and the reference pixel signals in the four directions surrounding the target pixel are D(i,j−1), D(i−1,j), D(i+1,j), and D(i,j+1). The corrected signal D'(i,j) after Laplacian filtering is expressed by equation [1].

$$D'(i,j) = D(i,j) + a \nabla^2 D \quad [1]$$

where "a" is a constant and $$\nabla^2 D = 4 \times D(i,j) - \{D(i,j-1) + D(i-1,j) + D(i+1,j) + D(i,j+1)\}$$

As the equations illustrate, this correction is achieved by adding the difference between the target pixel signal and the sum of the four reference pixel signals on the four sides of the target pixel to the target pixel signal.

In general, correcting the MTF by means of Laplacian filtering also enhances the noise in the picture, resulting in a grainy image with a decreased S/N ratio. To avoid this, a dead zone wherein the constant "a" is defined as zero (0) is provided to prevent image enhancement when the Laplacian operator $\nabla^2 D$ in the equation [1] is less than a predetermined threshold value.

An edge enhancement method is known (Japanese patent laid-open publication No. #SHO 63-3562) whereby each signal difference between a target pixel and a reference pixel is obtained, the image edge is detected using these differences, and enhancement is applied only in the direction of the image edge by switching the table of interpolation coefficients according to the detection result so that isolated noise components with no correlation to the edge pixel are not enhanced.

However, while the effects of noise are not included in the corrected signal when the level of noise in the image is less than the predetermined threshold value in this Laplacian filtering process, noise is also enhanced when the noise level exceeds this threshold value. Conversely, when the Laplacian operator $\nabla^2 D$ is less than the threshold value, even contour lines that should be enhanced are not properly enhanced.

Furthermore, while an edge enhancement method which changes the table of interpolation coefficients according to the result of a correlation detection has been proposed, detection of diagonal lines in an image, and particularly edge lines with an acute angle slope, is difficult. When detection errors occur and these diagonal lines are not detected, diagonal lines assume a jagged line on a display screen.

In addition, interference such as crossed colors and dot interference in the current NTSC (National Television System Committee) television system format causes a signal representing a straight line to be reproduced as a jagged line of single offset pixels. Applying Laplacian filtering to this jagged line simply results in an enhanced jagged line rather than the original straight line, and a corresponding deterioration of image quality.

Video printers which produce a hard-copy printout of the video signal are now commercially available. These video printers record the number of pixels corresponding to one television signal frame. When the input signal is a moving image, however, there is motion between the two fields forming a single frame. The field signals are therefore digitized, and the digitized field signals are interpolated to obtain the total number of pixels forming a single frame signal.

Application of this conventional Laplacian filtering process to the interpolated signal, however, cancels the effects of interpolation and loses the smoothness interpolated into diagonal lines.

SUMMARY OF THE INVENTION

Therefore, an object of the present invention is to provide an image processing method for reproducing a crisp image by suppressing enhancement of independent noise components in an image without introducing graininess, for enhancing continuous lines while suppressing enhancement of single pixel offset jagged lines caused by cross color and dot interference, and for crisp enhancement of frame signals generated by field signal interpolation without losing diagonal line smoothness.

To achieve these objects, an image processing method according to the present invention corrects a target pixel signal by repeating, in each of the four or eight directions passing through the four or eight pixels surrounding a target pixel in an input image, a process whereby the first reference pixel is defined as the reference pixel positioned in the first direction of the four or eight directions radiating from the target pixel, the second and third reference pixels are defined as the reference pixels positioned in the directions perpendicular to the first direction on opposite sides of the target pixel, the target pixel is enhanced proportionally to the difference between the target pixel signal and the first reference pixel signal, and the enhancement coefficient obtained by inputting this difference to a function with a simple increasing input/output characteristic, and is gradated or smoothed proportionally to the enhancement coefficient and the difference between the target pixel signal and the average of the second and third reference pixel signals.

By means of this image processing method, the difference between the target pixel signal and the first reference pixel signal is manipulated to enhance the target pixel, the difference between the average of the second and third reference pixel signals and the target pixel signal is manipulated to gradate or smooth the target pixel, and this enhancement-gradation process is repeated for each of the four or eight reference pixels surrounding the target pixel. As a result, independent noise components with no relation to the surrounding pixels, and jaggedness caused by cross colors and dot interference are not enhanced. In addition, sharp image enhancement of a frame signal generated by field signal interpolation is possible without deteriorating diagonal line smoothness.

BRIEF DESCRIPTION OF THE DRAWINGS

The present invention will become more fully understood from the detailed description given below and the accompanying drawings wherein:

FIGS. 6(a)–(f) show the pixel values obtained before and after applying the image processing method according to a first embodiment of the invention, FIGS. 7(a)–(f) show the pixel values obtained before and after applying the image processing method according to the prior art, FIGS. 10(a)–10(b) show the pixel values obtained before and after applying the image processing method according to a second embodiment of the invention, FIGS. 11(a)–11(b) shows the pixel values obtained before and after applying the image processing method according to the prior art, FIG. 12 shows the two processing steps which are different in the third embodiment of the invention, FIGS. 14(a)–14(b) is a graph of the function used to obtain the enhancement coefficients in a sixth embodiment of the invention, and the first multiplication result obtained thereby, and FIG. 15 is a table of pixel designations used to describe the Laplacian principle (spatial filtering process).

DESCRIPTION OF PREFERRED EMBODIMENTS

Figure 1:
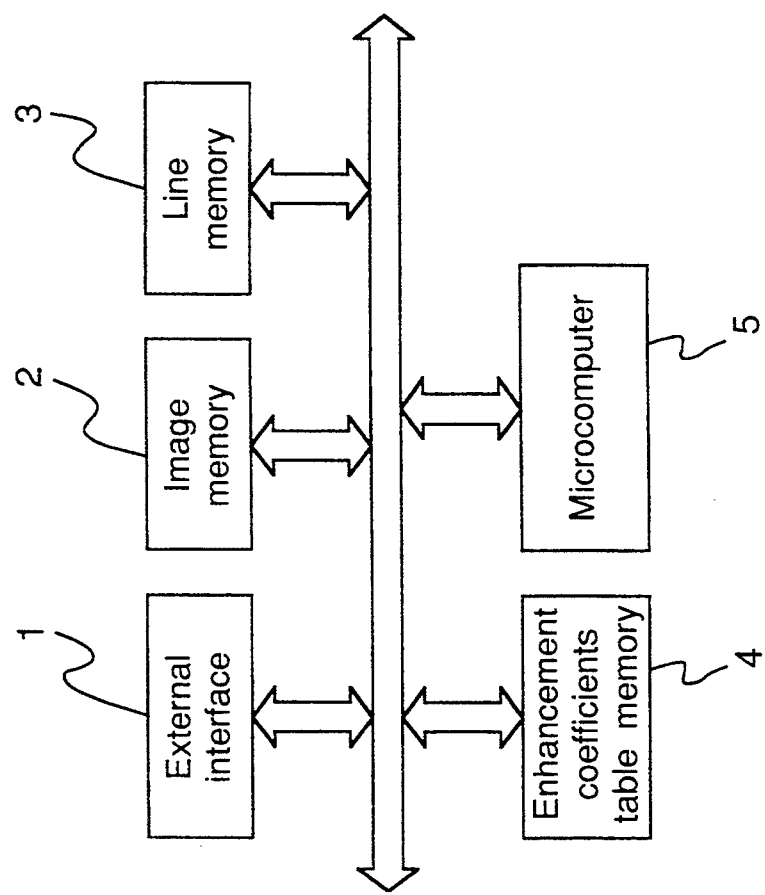
FIG. 1 is a block diagram of an image processing apparatus applying the image processing method according to a first embodiment of the invention.

The first embodiment of an image processing method according to the present invention is described hereinbelow with reference to the accompanying figures, of which FIG. 1 is a block diagram of an image processing apparatus applying the image processing method of the invention.

Referring to FIG. 1, this image processing apparatus comprises an external interface 1 for converting the input image signal to an 8-bit digital signal, an image memory 2 for storing the input image signal and the image signal after correction, a line memory 3 for storing the image signal stored in the image memory 2 in line units during signal processing, an enhancement coefficient table memory 4 for storing the enhancement coefficients, and a microcomputer 5 for controlling the image signal stored to the image memory 2, the line memory 3 data, and the enhancement coefficient table memory 4 data, and applying image processing. The microcomputer 5 comprises a CPU, RAM, ROM, and inputs and outputs.

Figure 2:
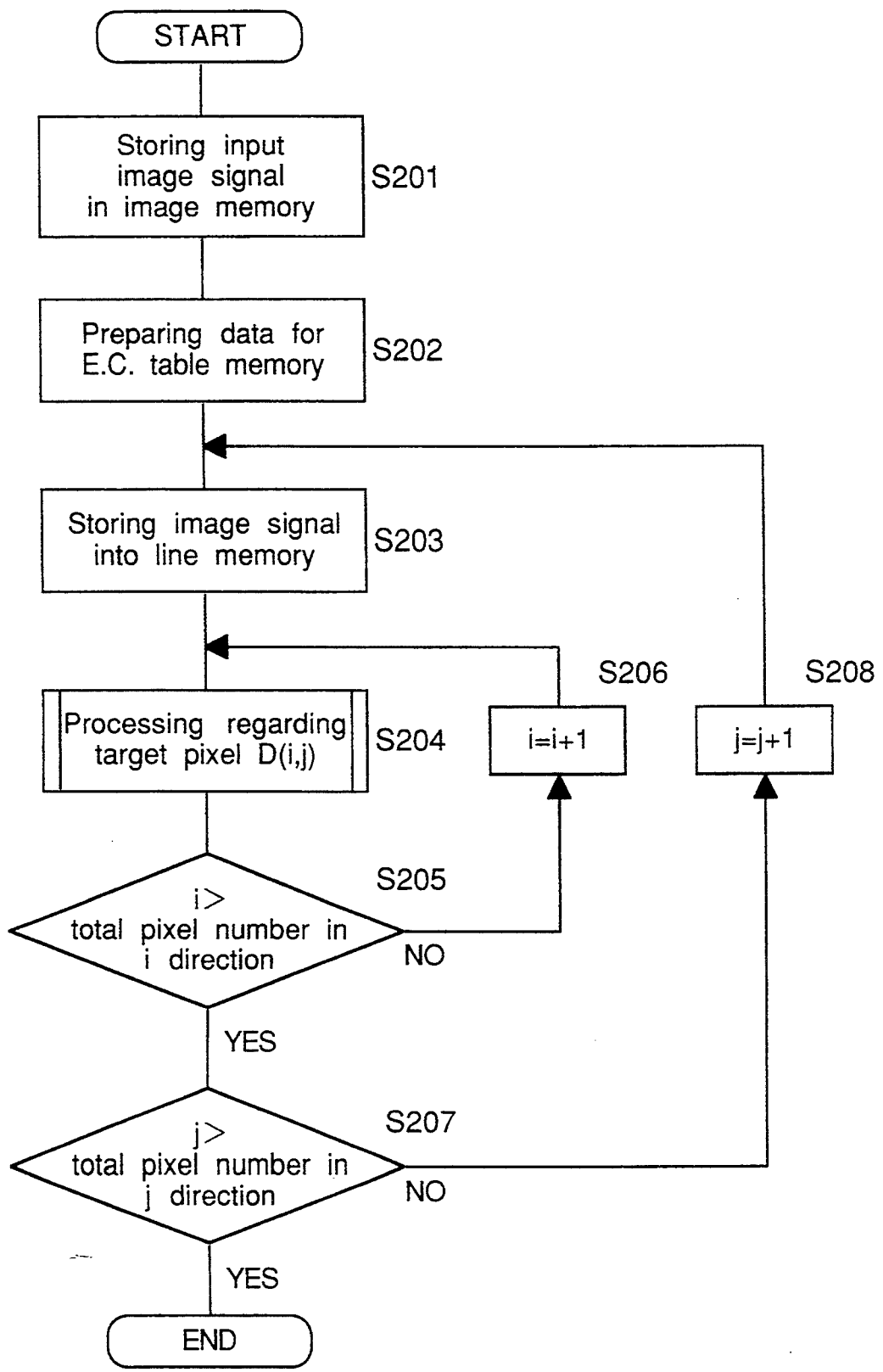
FIG. 2 is the main flow chart of the image processing operation of the image processing method according to a first embodiment of the invention.

In this image processing apparatus according to the first embodiment, the microcomputer 5 executes the image processing method of the invention in software. The overall flow of this process is shown in FIG. 2 with additional details of the process shown in the flow charts in FIGS. 3 and 4.

It is to be noted that the matrix size of the spatial filter in this embodiment is $3 \times 3$, and the four pixels positioned in the four horizontal and vertical directions to the target pixel are used as the reference pixels. As shown in FIG. 15, the target pixel signal is designated $D(i,j)$, and the four reference pixel signals are $D(i,j-1)$, $D(i-1,j)$, $D(i+1,j)$, and $D(i,j+1)$.

The overall process flow is described below with reference to FIG. 2.

At step S201 the input image signal to be processed is converted by the external interface 1 to an 8-bit digital signal, and then stored in the image memory 2. The enhancement coefficient data is prepared in the enhancement coefficient table memory 4 at step S202. To enable spatial filtering of the input image signal, the image signal is read from the image memory 2 at each line cycle of the process, and stored in the line memory 3 at step S203. The target pixel signal $D(i,j)$ is then processed at step S204. The position of the pixel to be processed is then set in steps S205, 206, 207, and 208, and the process is repeated for each pixel to obtain the corrected image.

Figure 3:
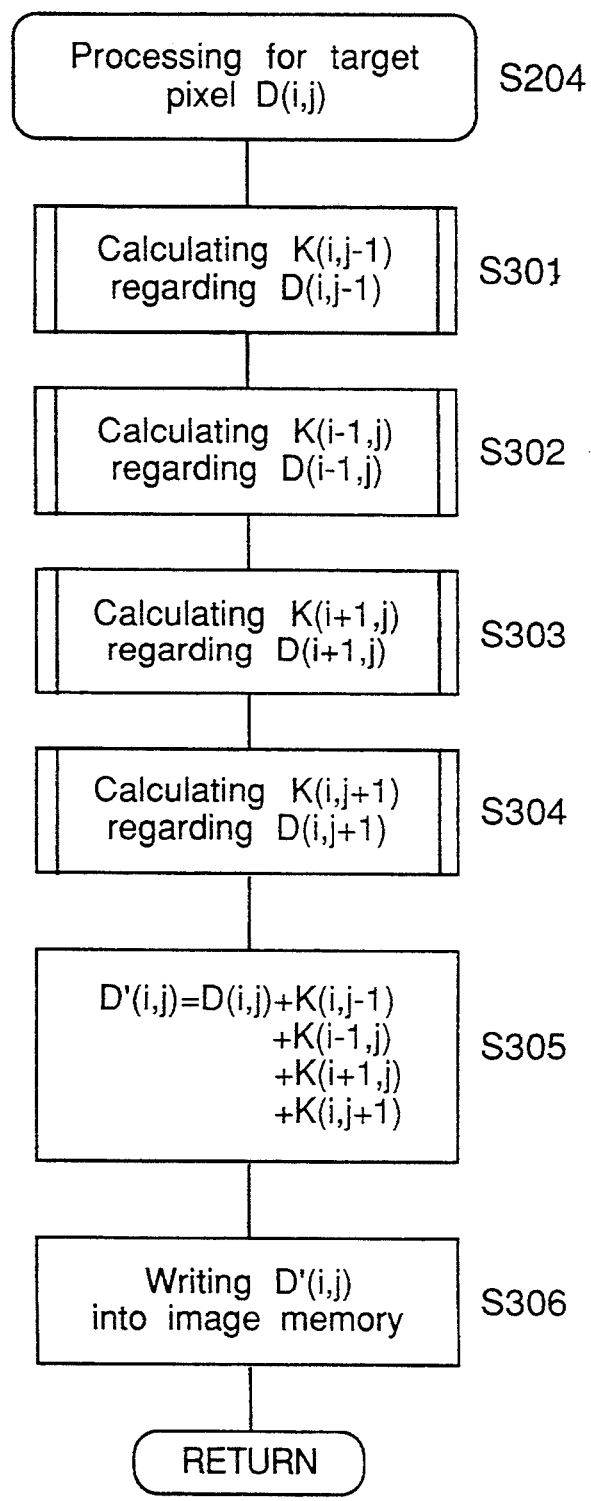
FIG. 3 is a flow chart of the processing applied to the target pixel in the image processing method according to a first embodiment of the invention.

The process applied to the target pixel signal $D(i,j)$ in step S204 is described in more detail below referring to the flow chart in FIG. 3.

In the first step S301, the reference pixel positioned vertically above the target pixel is defined as the first reference pixel, and the enhancement processing result $K(i,j-1)$ for the first reference pixel signal $D(i,j-1)$ is obtained. This same basic operation is repeated in steps S302–S304 to obtain the enhancement processing result $K(i-1,j)$–$K(i,j+1)$ for each of the reference pixel signals $D(i-1,j)$–$D(i,j+1)$. The corrected image signal $D'(i,j)$ is then obtained in step S305 by adding the target pixel signal $D(i,j)$ and the enhancement processing results $K(i,j-1)$–$K(i,j+1)$ for each of the reference pixels. This corrected image signal $D'(i,j)$ is defined by equation [2].

$$D'(i,j)=D(i,j)+K(i,j-1)+K(i-1,j)+K(i+1,j)+K(i,j+1) \quad [2]$$

In step S306, the corrected image signal D'(i,j) is written to the image memory 2, and processing of this one pixel is completed.

The enhancement process effected in steps S301–S304 is described with reference to the FIG. 4 flow chart and using step S301 by way of example.

Of the four directions enclosing the target pixel, the direction vertically above the target pixel is defined as the first direction, and the reference pixel expressed as D(i,j−1) is defined as the first reference pixel. The two pixels in the horizontal directions perpendicular to this first direction and positioned on opposite sides of the target pixel are defined as the second and third reference pixels (expressed as D(i−1,j) and D(i+1,j)). These three reference pixels are used for enhancement processing.

The first difference, the difference between the target pixel and the first reference pixel, is obtained in step S401 using equation [3].

$$|D(i,j)-D(i,j-1)| \quad [3]$$

The enhancement coefficient table memory 4 is referenced in step S402 based on the first difference, and the enhancement coefficient k is obtained. The target pixel is enhanced proportionally to the first difference and the enhancement coefficient in step S403 by multiplying the enhancement coefficient k times the difference of the target pixel signal D(i,j) minus the first reference pixel signal D(i,j−1) to obtain the first multiplication result A(i,j−1) (equation [4]).

$$A(i,j-1)=k\times\{D(i,j)-D(i,j-1)\} \quad [4]$$

To gradate or smooth the target pixel using the second and third reference pixel signals in step S404, the second multiplication result B(i,j−1) is obtained by multiplying the enhancement coefficient k times the difference of the target pixel signal D(i,j) minus the average of the second reference pixel signal D(i−1,j) and the third reference pixel signal D(i+1,j) (equation [5]).

$$B(i,j-1)=k\times[D(i,j)-\{D(i-1,j)+D(i+1,j)\}/2] \quad [5]$$

The enhancement result K(i,j−1) for the first reference pixel signal D(i,j−1) is obtained in step S405 by subtracting the second multiplication result B(i,j−1) from the first multiplication result A(i,j−1) (equation [6]).

$$K(i,j-1)=A(i,j-1)-B(i,j-1) \quad [6]$$

Though not shown in the figures, the process executed in steps S302–S304 is the same as that shown in FIG. 4, and the enhancement results K(i−1,j)-K(i,j+1) for the reference pixels in each of the four directions surrounding the target pixels can be returned by shifting the first, second, and third reference pixel definitions in steps S302–S304 as follows. In step S302, the first reference pixel is D(i−1,j), and the second and third reference pixels are D(i,j− 1) and D(i,j+1), respectively. In step S303, the first reference pixel is D(i+1,j), and the second and third reference pixels are D(i,j−1) and D(i,j+1), respectively. In step S304, the first reference pixel is D(i,j+1), and the second and third reference pixels are D(i−1,j) and D(i+1,j), respectively.

The functions used to compile the data in the enhancement coefficient table memory 4 in this first embodiment are described next.

Figures 5, 8:
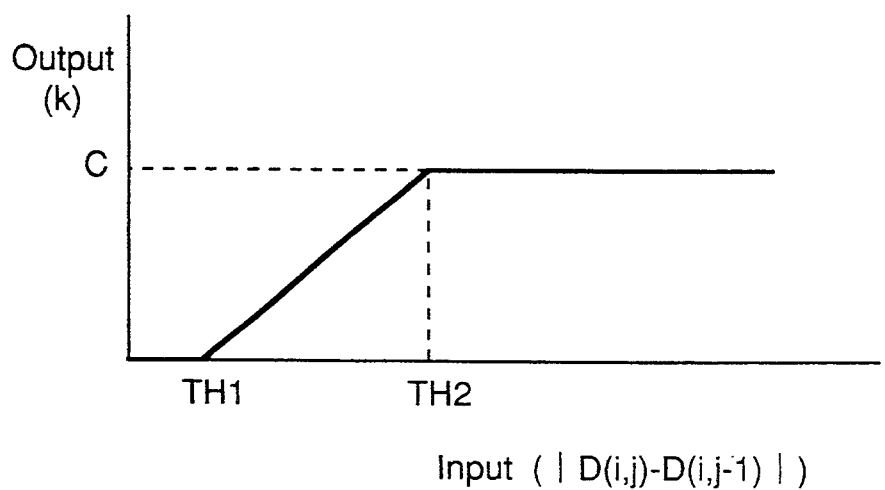
FIG. 5 is a graph of the function used to obtain the enhancement coefficients in the image processing method according to a first embodiment of the invention.
FIG. 8 is a table showing the target pixel and reference pixel designations in the preferred embodiments of the invention.

FIG. 5 is a graph of the input/output characteristics of the function determining the enhancement coefficient k used in the first embodiment. The difference between the target pixel and the first reference pixel defined in equation [2] is obtained on the horizontal axis, and the enhancement coefficient k is obtained from the vertical axis. This function is defined as shown in equation [7] to be a simple increasing function when the input is approximately zero (0).

$$k=0 \quad x\leq TH1$$
$$k=a\cdot x \quad TH1<x\leq TH2$$
$$k=C \quad TH2<x \quad [7]$$

where "a" is a constant, "x" is the first difference, and "C" is a constant.

The configuration and process of the image processing method according to the first embodiment of the invention were described above. An example of the processing results of this first embodiment are described below with reference to FIGS. 6(a)–(f).

FIGS. 6(a), (c), and (e) represent the input image signal before processing, and FIGS. 6(b), (d), and (f) represent the image signal after correction. The corresponding image signals obtained with the conventional method are shown in FIGS. 7(a)–(f).

It is to be noted that the threshold value expressing the dead zone to the Laplacian operator $\nabla^2 D$ in the conventional correction method is assumed to be 60 and the value of constant "a" in equation [1] is 0.5. In the image processing method of the invention, the first threshold value is assumed to be TH=8, the second threshold value to be TH=128, and constant "a" to be 0.00236 in equation [7] so that an approximately equal enhancement effect is obtained when the difference between the target pixel signal and the reference pixel signal is 16.

FIGS. 6(b) and 7(b) illustrate the correction results for isolated noise components with no correlation to the surrounding pixels. In the correction achieved with the present invention as shown in FIG. 6, there is a slight level change in the four pixels surrounding the noise component, but the level of the noise component is unchanged, and the noise component is thus not enhanced. In the image obtained with the conventional correction method (FIG. 7), however, the noise component is strongly enhanced with the level change in the four surrounding pixels because the difference between the noise component level and the surrounding pixel levels exceeds the threshold value of the dead zone. FIG. 6(d) and FIG. 7(d) illustrate the correction results for the vertical line component. In the correction achieved with the present invention as shown in FIG. 6, the signal levels of the pixels representing the vertical line component and the pixels on both sides of the line component are changed so that the line component is specifically enhanced. In the image obtained with the conventional correction method (FIG. 7), however, the Laplacian operator value is less than the threshold value even though the signal represents the line component to be enhanced, and as a result, the vertical line component is not enhanced.

FIG. 6(f) and FIG. 7(f) illustrate the correction results for a signal representing a vertical line component which has been distorted pixel by pixel into a jagged line due to cross color or dot interference in the NTSC signal. In the correction achieved with the present invention as shown in FIG. 6, the enhancement is minimal. In the image obtained with the conventional correction method (FIG. 7), however, the line is enhanced even though it is distorted, and the undesirable affects of cross color and dot interference are further enhanced.

As described above, line components in an input image signal can be enhanced without enhancing separate noise components having no correlation to the surrounding pixels. This is enabled in the first embodiment of the invention by enhancing the target pixel in proportion to a first difference, which is the difference between the target pixel signal and the signal of a first reference pixel (which is the reference pixel positioned in the first direction), and an enhancement coefficient, which is obtained from the first difference with reference to a function having an input/output characteristic with a simple increasing output when the input is approximately zero (0), gradating or smoothing other pixels in proportion to this enhancement coefficient and a second difference, which is the difference between the average of the signals for the second and third reference pixels (which are positioned in the direction perpendicular to the first direction and are on opposite sides of the target pixel) subtracted from the target pixel signal, and performing this enhancement/blurring process in each of the four directions radiating from the target pixel to correct the target pixel signal. In addition, this process prevents excessive enhancement of jagged lines caused by NTSC cross color or dot interference.

Second Embodiment

The second embodiment of the invention is described below. The reference pixels used in this second embodiment are the eight pixels positioned on the eight directions radiating from the target pixel. Specifically, these eight pixels are the four reference pixels vertically and horizontally adjacent to the target pixel as described in the first embodiment above, and the four pixels positioned diagonally to the target pixel at the top left, top right, bottom left, and bottom right corners of the target pixel. If the target pixel is referenced as D(i,j), the eight reference pixel signals are referenced as D(i−1,j−1), D(i,j−1), D(i+1,j−1), D(i−1,j), D(i+1,j), D(i−1,j+1), D(i,j+1), and D(i+1,j+1).

Figure 9:
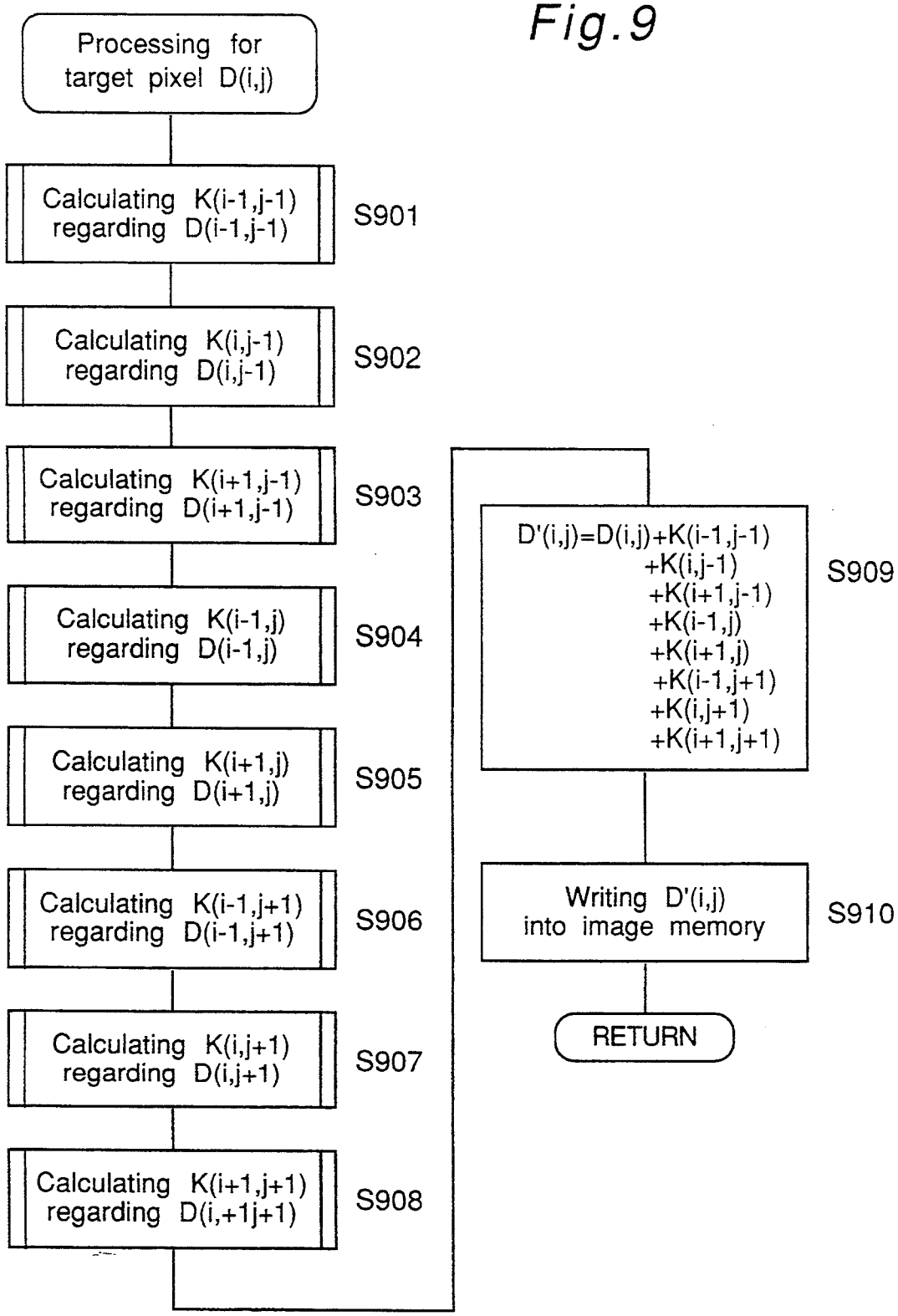
FIG. 9 is a flow chart of the processing applied to the target pixel in the image processing method according to a second embodiment of the invention.

The flow of the overall process applied by this embodiment is essentially identical to that of the first embodiment described above. Because the number of reference pixels has increased to eight in this embodiment, however, the processing of the target pixel signal D(i,j) differs. A detailed flow chart of target pixel signal D(i,j) processing applied in the second embodiment at Step S204 in FIG. 2 is shown in FIG. 9.

In the processing of the target pixel signal D(i,j) in the second embodiment (Step S204), the reference pixel identified as D(i−1,j−1) to the top left of the target pixel is defined as the first reference pixel at Step S901, and the enhancement coefficient K(i−1,j−1) for this first reference pixel signal is obtained. The enhancement coefficients K(i,j−1)-K(i+1,j+1) are similarly obtained for the reference pixel signals D(i,j−1)-D(i+1,j+1) in Steps S902-S908.

The corrected target pixel signal D'(i,j) is then obtained in Step S909 by adding the target pixel signal D(i,j) and the enhancement results K(i−1,j−1)−K(i+1,j+1) as shown in equation [8].

$$D'(i,j) = D(i,j) + K(i-1,j-1) + K(i,j-1) + \qquad [8]$$
$$K(i+1,j-1) + K(i-1,j) + K(i+1,j) +$$
$$K(i-1,j+1) + K(i,j+1) + K(i+1,j+1)$$

The resulting image signal D'(i,j) is then written to the image memory 2 at Step S910, and processing of the one target pixel is completed.

It is to be noted that the process for obtaining the enhancement coefficients K(i−1,j−1)−K(i+1,j+1) for reference pixels D(i−1,j−1)-D(i+1,j+1) in Steps S901-S908 is the same as the process used in the first embodiment and described with reference to the flow chart in FIG. 4. Specifically, the enhancement results K(i−1,j)-K(i,j+1) for each of the reference pixels are obtained by defining the first, second, and third reference pixel signals, respectively, as D(i−1,j−1), D(i+1,j−1), and D(i−1,j+1) in Step S901; D(i,j−1), D(i−1,j), and D(i+1,j) in Step S902; D(i+1,j−1), D(i−1,j−1), and D(i+1,j+1) in Step S903; D(i−1,j), D(i,j−1), and D(i,j+1) in Step S904; D(i+1,j), D(i,j−1), and D(i,j+1) in Step S905; D(i−1,j+1), D(i−1,j−1), and D(i+1,j+1) in Step S906; D(i,j+1), D(i−1,j), and D(i+1,j) in Step S907; and as D(i+1,j+1), D(i+1,j−1), and D(i−1,j+1) in Step S908.

An example of the processing results of this second embodiment are described below.

FIGS. 10 (a) and (b) represent the input image signal before processing and the image signal after correction, respectively. A diagonal border band produced by interpolation is assumed in the input image. The corresponding image signals obtained with the conventional method are shown in FIGS. 11 (a)–(b).

For comparison with the present invention, the eight surrounding pixels are assumed to be corrected using a Laplacian operator in FIG. 11 where the threshold value of the Laplacian dead zone is 120, and the value of constant "a" in equation [1] is 1. The same functions and values used in the first embodiment of the invention are also used in this second embodiment to obtain the enhancement coefficients.

The correction processing applied by the second embodiment of the invention smoothly enhances the diagonal contour line in the input image signal. In the conventional method, however, the contour that needs to be enhanced is not enhanced at all because the Laplacian operator value is less than the threshold value.

As described above, diagonal border bands generated by interpolation can be enhanced without losing the smoothness of the line to reproduce a crisp image by using as the reference pixels the eight pixels surrounding the target pixel.

Third Embodiment

The third embodiment of the invention is described next.

Figure 4:
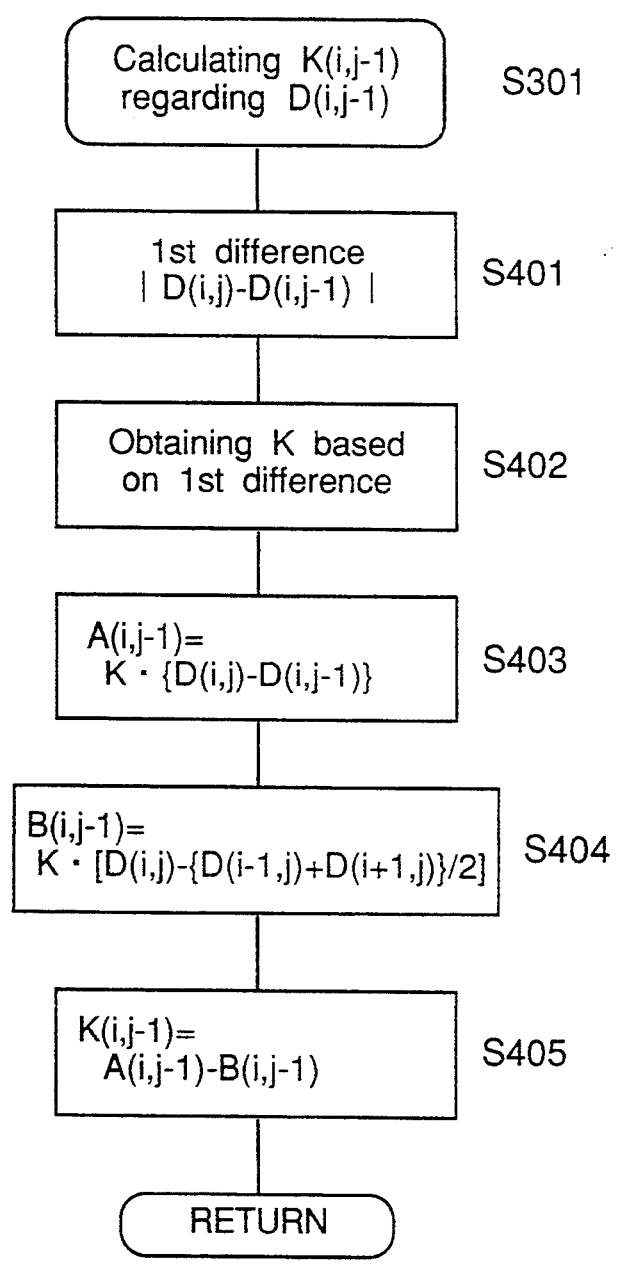
FIG. 4 is a flow chart of the process obtaining the enhancement result for the reference pixels in the image processing method according to a first embodiment of the invention.

This third embodiment differs from the first embodiment in the processing applied to obtain the first multiplication result A(i,j−1) and the second multiplication result B(i,j−1) shown as Steps S403 and S404 in FIG. 4.

The steps (S1403, S1404) corresponding to Steps S403 and S404 in FIG. 4 in the third embodiment are shown in FIG. 12. As shown in Step S1403, the first multiplication result A(i,j−1) is obtained by multiplying the sum of the enhancement coefficient k and a second enhancement coefficient k2, which is a constant, by the first difference (equation [9]). As shown in Step S1404, the second multiplication result B(i,j−1) is obtained by multiplying the difference of the enhancement coefficient k and a second enhancement coefficient k2, which is a constant, by the difference of the target pixel signal minus the average of the second and third reference pixel signals (equation [10]).

$$A(i,j-1)=(k+k2)\times\{D(i,j)-D(i,j-1)\} \quad [9]$$

$$B(i,j-1)=(k-k2)\times[D(i,j)-\{D(i-1,j)+D(i+1,j)\}/2] \quad [10]$$

Basically, in this third embodiment, enhancement of the target pixel using the first reference pixel signal and gradating or smoothing of the target pixel using the average of the second and third reference pixel signals are regulated using the second enhancement coefficient k2. When the sign of the second enhancement coefficient k2 is positive, the degree of enhancement is increased relative to gradation, and when sign of the second enhancement coefficient k2 is negative, the degree of enhancement is decreased relative to blurring.

Thus, because the degree of image enhancement obtained by correction can be increased when the S/N ratio of the input image signal is good, a sharp image with strong line definition can be reproduced by using a positive second enhancement coefficient k2. Conversely, because the degree of image enhancement obtained by correction cannot be increased when the S/N ratio of the input image signal is not very good, an image with minimal graininess and suppressed enhancement of noise components can be obtained by using a negative second enhancement coefficient k2.

Thus, this third embodiment of the invention controls the degree of image enhancement and pixel gradation or smoothing, and can adjust the degree of image enhancement obtained by correction by manipulating the value of a second enhancement coefficient k2, and using this second enhancement coefficient k2 to obtain the first multiplication result A(i,j−1) (which is the product the sum of the enhancement coefficient k and the second enhancement coefficient k2, which is a constant, by the difference of the target pixel signal minus the first reference pixel signal) and the second multiplication result B(i,j−1) (which is the product of the difference of the enhancement coefficient k and a second enhancement coefficient k2, which is a constant, by the difference of the target pixel signal minus the average of the second and third reference pixel signals).

Fourth Embodiment

The fourth embodiment of the invention is described next.

This fourth embodiment differs from the first embodiment in the processing applied to obtain the first multiplication result A(i,j−1) shown as Step S403 in FIG. 4.

Specifically, the first multiplication result A(i,j−1) this embodiment is obtained as the product of the first difference multiplied by the enhancement coefficient k, which is then multiplied by a third enhancement coefficient k3, which is a constant. See equation [11].

$$A(i,j-1)=k3\times k\times\{D(i,j)-D(i,j-1)\} \quad [11]$$

Essentially, in this fourth embodiment, the degree of target pixel enhancement using the first reference pixel signal is controlled using the third enhancement coefficient k3. When the value of the third enhancement coefficient k3 is greater than one (1), the degree of enhancement is increased relative to the degree of blurring, and when the value of the third enhancement coefficient k3 is less than one (1), the degree of enhancement is decreased relative to the degree of gradation.

Because the degree of image enhancement obtained by correction can be increased when the S/N ratio of the input image signal is good, a sharp image with strong line definition can be reproduced by setting the third enhancement coefficient k3 to a value greater than one. Conversely, because the degree of image enhancement obtained by correction cannot be increased when the S/N ratio of the input image signal is not very good, an image with minimized graininess and suppressed enhancement of noise components can be obtained by setting the third enhancement coefficient k3 to a value less than one.

Thus, this fourth embodiment of the invention can adjust the degree of image enhancement obtained by correction by manipulating the value of a third enhancement coefficient k3 to control relative pixel enhancement and gradating because it uses as the first multiplication result A(i,j−1) a new product obtained by multiplication with a constant third enhancement coefficient k3.

Fifth Embodiment

The fifth embodiment of the invention is described next.

This fifth embodiment differs from the first embodiment in the function used to obtain the enhancement coefficients.

Figure 13A:
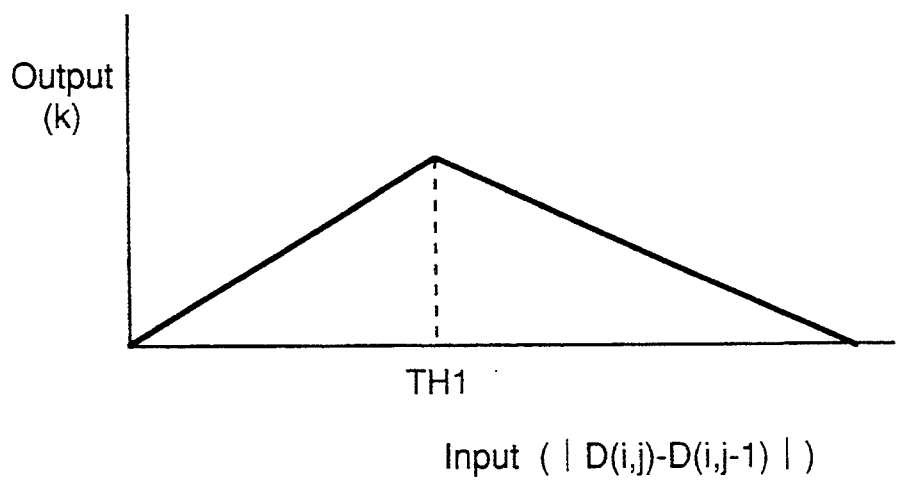
FIGS. 13(a)–13(b) is a graph of the function used to obtain the enhancement coefficients in a fifth embodiment of the invention, and the first multiplication result obtained thereby.
Figure 13B:
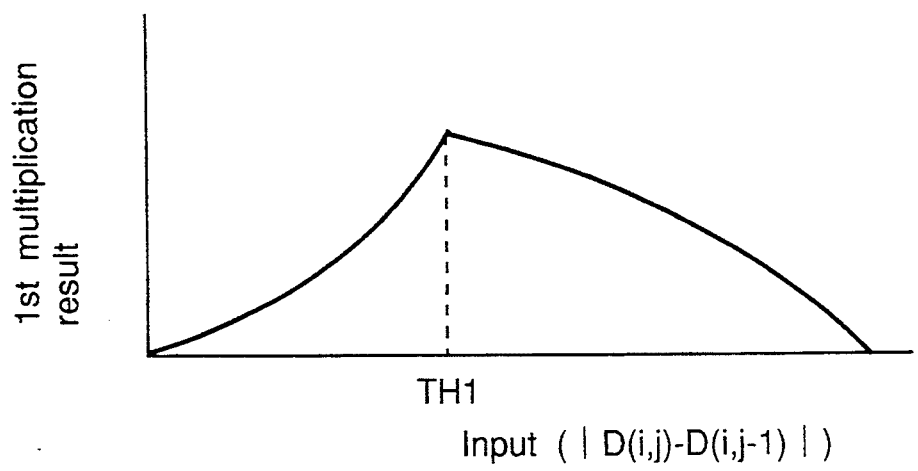

FIG. 13(a) is a graph of the input/output characteristics of the function used in this fifth embodiment to obtain the enhancement coefficients, and FIG. 13(b) is a graph of the first multiplication result obtained using this function. In the fifth embodiment, the input/output characteristics are continuous such that the output is a simple increasing value when the input is less than or equal to a first threshold value TH1, and the output is a simple decreasing value when the input is greater than this first threshold value TH1. This function is shown in equation [12].

$$k=a1\cdot x \quad x\leq TH1$$

$$k=-a2\cdot x \quad TH1<x \quad [12]$$

where "a1" and "a2" are positive constants and "x" is the first difference.

As will be known from FIG. 13(b), when the difference of the target pixel signal and the first reference pixel signal is less than the first threshold value, the degree of enhancement increases with the increase in the difference, and when this difference is greater than the first threshold value, the degree of enhancement decreases with the increase in the difference. When the difference between the target pixel signal and the first reference pixel signal is less than the first threshold value, the degree of enhancement is increased smoothly with the increase in the difference, making it possible to obtain natural image enhancement. When the difference is greater than the first threshold value, unnatural enhancement is not applied and the enhancement is not conspicuous because the degree of enhancement is suppressed.

Thus, the fifth embodiment of the invention uses to obtain the enhancement coefficients a function that has continuous input/output characteristics whereby the output is a simple increasing value when the input is less than the first threshold value TH1 and is a simple decreasing value when the input is greater than the first threshold value TH1. By using such a function, this fifth embodiment can apply natural image enhancement to an input image such that the degree of image enhancement increases smoothly so that pixels on a clearly defined contour line in the image are not unnaturally enhanced and image enhancement is natural and not conspicuous. In addition, when simple increasing and simple decreasing functions are used as primary input functions as shown in the fifth embodiment, a circuit for determining the enhancement coefficients can be constructed with a simple hardware configuration.

Sixth Embodiment

The sixth embodiment of the invention is described next.

This sixth embodiment differs from the first embodiment in the function used to obtain the enhancement coefficients.

FIG. 14(a) is a graph of the input/output characteristics of the function used in this sixth embodiment to obtain the enhancement coefficients, and FIG. 14(b) is a graph of the first multiplication result obtained using this function. In the sixth embodiment, the input/output characteristics are continuous such that the output is zero (0) when the input is less than a first threshold value TH1, the output is a simple increasing value when the input is greater than the first threshold value TH1 and less than or equal to a second threshold value TH2 (where TH1<TH2) and the derivative is a simple decreasing value, and the output is a simple decreasing value and the derivative is a simple decreasing value when the input is greater than the second threshold value. This function is shown in equation [13].

$$k = 0 \quad x \leq TH1$$

$$k = \{a1/(TH2-TH1)\} \times (1-TH1/x) \quad TH1 < x \leq TH2$$

$$k = a1/x \quad TH2 < x \quad [13]$$

where "a1" is a constant and "x" is the first difference.

As will be known from FIG. 14(b), when the difference of the target pixel signal and the first reference pixel signal is less than the first threshold value, the first multiplication result will be zero (0), when the difference is greater than the first threshold value and less than or equal to the second threshold value, the multiplication result increases in proportion to the difference, and when the difference is greater than the second threshold value, the multiplication result is the constant a1.

Using the function of the sixth embodiment, when the first difference (which is the difference between the target pixel signal and the first reference pixel signal) is less than or equal to the first threshold value, the enhancement coefficient is zero. As a result, the degree of target pixel enhancement using the first reference pixel signal, and the degree of target pixel blurring using the second and third reference pixels, is reduced to zero in both cases. In other words, by providing a dead zone to the relatively low level noise component in the high frequency component, graininess caused by the noise component can be suppressed. Then when the first difference is greater than the first threshold value and less than the second threshold value, there is a linear increase in the first multiplication result (i.e., enhancement coefficient×first difference) following the increase in the first difference, and natural image enhancement with the degree of enhancement increasing smoothly in proportion to the first difference can be achieved. Furthermore, the first multiplication result becomes a constant when the first difference is greater than the second threshold value, and image enhancement of pixels on clearly defined contours in the input image signal with low attenuation of the high frequency component can be achieved without the enhancement being conspicuous or unnatural.

Thus, the sixth embodiment of the invention uses a function to obtain the enhancement coefficients that has continuous input/output characteristics whereby the output is zero (0) when the input is less than or equal to a first threshold value, the output is a simple increasing value when the input is greater than a first threshold value TH2 and less than or equal to a second threshold value TH1 (where TH1<TH2) and the derivative is a simple decreasing value, and the output is a simple decreasing value and the derivative is a simple decreasing value when the input is greater than the second threshold value. By using this function, graininess can be suppressed without enhancing low level noise components in the high frequency component, pixels that should be enhanced can be enhanced naturally, and pixels in the input image signal with clearly defined contours can be enhanced without the enhancement being conspicuous or unnatural, resulting in natural enhancement of the overall image.

It is to be noted that the microcomputer 5 generates the table data in the enhancement coefficient table memory 4 consisted of a RAM each time an image signal is input in the first embodiment of the invention so that the enhancement coefficients generated by different functions can be studied, but the data in the enhancement coefficient tables can also be stored permanently in a ROM. Because using a ROM eliminates the need to generate the table each time an input image signal is obtained, this configuration will yield faster processing times.

In addition, the enhancement coefficient table memory 4 is provided in the first embodiment to obtain the enhancement coefficients from the difference between the target pixel signal and the first reference pixel signal by referencing the enhancement coefficient table memory 4. It is possible, however, to provide a first multiplication results table storing all products of the enhancement coefficients and first differences, and to provide a second multiplication results table storing all products of the enhancement coefficients and the difference between the target pixel signal and the average of the second and third reference pixel signals. With this configuration the first and second multiplication results can be directly referenced, and processing can be executed more quickly because the time otherwise required to calculate these values is thus eliminated.

As described hereinabove, the image processing method of the invention can enhance only the line components of the input image signal without enhancing separate noise components that have no correlation to the surrounding pixels. The invention does this by correcting the target pixel signal by repeating in the four or eight directions around the target pixel a process that manipulates the target pixel signal and first, second, and third reference pixel signals in each of the four or eight directions. In the first of these four or eight operations, the first reference pixel is defined as the reference pixel on the first of the four or eight directions radiating from the target pixel, and the second and third reference pixels are defined as the reference pixels positioned in the directions perpendicular to the first direction with the target pixel sandwiched between the second and third reference pixels. Pixels are enhanced proportionally to the first difference (which is the difference between the target pixel signal and the first reference pixel signal) and the enhancement coefficient (which is obtained from the first difference by referencing a function with an input/output characteristic where the output is a simple increasing value when the input is approximately zero (0)), and pixels are blurred proportionally to the enhancement coefficient and a second difference (which is the difference of the target pixel signal minus the average of the second and third reference pixel signals). In each of the remaining four or eight operations, the direction of the first reference pixel is incremented with the second and third reference pixels incrementing accordingly until this operation is performed once in each of the four or eight directions.

By applying pixel enhancement and blurring operations using reference pixel signals, the image processing method of the invention reflects the correlation between the target pixel and the reference pixels. Because the method of the invention therefore does not perform a correlation detection and change the processing contents according to the detection result, as is required in conventional methods, jagged edges and lines resulting from correlation detection errors in the prior art are not produced, and image enhancement without losing diagonal line smoothness is possible.

Furthermore, signals representing straight lines that become jagged lines due to cross color or dot interference in the NTSC format with the prior art can be enhanced with the method of the invention without enhancing jaggedness and with enhancement of just the line components in the input image signal occurring.

In addition, the present invention enables effective image enhancement yielding crisp images without losing diagonal line smoothness in frame signals generated by field signal interpolation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented image signal processing method for converting an input image signal denoting a first two-dimensional image into an output image signal denoting a second two-dimensional image which is visually enhanced relative to the first two-dimensional image, said input image signal containing plural pixel signals each defining a relative image density of a corresponding pixel of the first two-dimensional image, said method comprising:

a first step of storing in a memory the plural pixel signals contained by said input image signal;

a second step of extracting, from among said plural pixels stored in the memory, a pixel as a target pixel and 4n pixels (n=1 or 2) located adjacent to said target pixel in $4 \times n$ radial directions of said first two-dimensional image each having an equal angular pitch of (360°/4n) with respect to said target pixel, a third step of subjecting the target pixel to an enhancement process by obtaining $4 \times n$ first differences for said $4 \times n$ radial directions, each of said $4 \times n$ first differences being a difference between said target pixel and each of said $4 \times n$ pixels, and then enhancing said target pixel with 4n enhancement factors, each of said 4n enhancement factors being defined as a product of said $4 \times n$ first differences and an enhancement coefficient which is determined according to an absolute value of a corresponding one of said $4 \times n$ first differences;

a fourth step of subjecting the target pixel to a smoothing process by obtaining $4 \times n$ mean values for said $4 \times n$ pixels, each of said $4 \times n$ mean values being defined as a mean value of a pair of two pixels selected from among said $4 \times n$ pixels in such a manner that said two pixels are located in two radial directions of said two-dimensional image orthogonal to each of said $4 \times n$ radial directions, obtaining $4 \times n$ second differences for said $4 \times n$ radial differences, each of said $4 \times n$ second differences being a difference between said target pixel and each of said $4 \times n$ mean values, and then smoothing said target pixel with $4 \times n$ smoothing factors, each of said $4 \times n$ smoothing factors being defined as a product of one of said $4 \times n$ second differences and a corresponding one of said enhancement coefficients obtained in said enhancement process;

a fifth step of repeating said second through fourth steps with respect to each remaining pixel from among said plural pixel signals stored in said memory so as to subject each said remaining pixel to said enhancement and smoothing processes to obtain corresponding enhanced and smoothed image pixel signals;

a sixth step of accumulating the enhanced and smoothed image pixels and forming the output image signal containing the enhanced and smoothed image pixel signals each defining an image density of a corresponding pixel of the second two-dimensional image.

2. The image processing method as claimed in claim 1, wherein said target pixel is enhanced by adding said $4 \times n$ enhancement factors thereto.

3. The image processing method as claimed in claim 1, wherein said enhancement coefficient is defined as a function of said absolute value of a corresponding one of said $4 \times n$ first difference.

4. The image processing method as claimed in claim 3, wherein said function has an input/output characteristic which monotonically increases with an input when the input is smaller than a predetermined threshold and monotonically decreases with the input when it is larger than said predetermined threshold.

5. The image processing method as claimed in claim 3, wherein said linear function has an input/output characteristic which monotonically increases with an input when it is smaller than a predetermined threshold and is kept at a constant value when the input exceeds said predetermined threshold.

6. The image processing method as claimed in claim 1, wherein the smoothing of said target pixel is performed by subtracting said 4×n smoothing factors therefrom.

7. A computer-implemented image signal processing method for converting an input image signal denoting a first two-dimensional image into an output image signal denoting a second two-dimensional image which is visually enhanced relative to the first two-dimensional image, said input image signal containing plural pixel signals each defining a relative image density of a corresponding pixel of the first two-dimensional image, said method comprising:

a first step of storing in a memory the plural pixel signals contained by said input image signal;

a second step of extracting, from among said plural pixel signals stored in said memory, a pixel as a target pixel and 4n pixels (n=1 or 2) located adjacent to said target pixel in 4×n radial directions of said first two-dimensional image each having an equal angular pitch of (360°/4n) with respect to said target pixel;

a third step of subjecting the target pixel to an enhancement process by obtaining 4×n first differences for said 4×n radial directions, each of said 4×n first differences being a difference between said target pixel and each of said 4×n pixels, and then enhancing said target pixel with 4n enhancement factors, each of said 4n enhancement factors being determined according to a corresponding one of said 4×n first differences and absolute values thereof;

a fourth step of subjecting the target pixel to a smoothing process by obtaining 4×n mean values for said 4×n pixels, each of said 4×n mean values being defined as a mean value of a pair of two pixels selected from among said 4×n pixels in such a manner that said two pixels are located in two radial directions orthogonal to each of said 4×n radial directions, obtaining 4×n second differences for said 4×n radial differences, each of said 4×n second differences being a difference between said target pixel and each of said 4×n mean values, and then smoothing said target pixel with 4×n smoothing factors, each of said 4×n smoothing factors being determined according to a corresponding one of said 4×n second differences and an absolute value of a corresponding one of said 4×n first differences;

a fifth step of repeating said second through fourth steps with respect to each remaining pixel from among said plural pixels stored in said memory so as to subject each said remaining pixel to said enhancement and smoothing processes to obtain corresponding enhanced and smoothed image pixel signals;

a sixth step of accumulating the enhanced and smoothed image pixel signals and forming the output image signal containing the enhanced and smoothed image pixel signals each defining an image density of a corresponding pixel of the second two-dimensional image.

* * * * *